United States Patent [19]

Robinson

[11] Patent Number: 5,795,262

[45] Date of Patent: Aug. 18, 1998

[54] AUTOMATIC NEUTRAL TO DRIVE SHIFT CONTROL

[75] Inventor: Timothy Alan Robinson, Indianapolis, Ind.

[73] Assignee: General Motors Corporation, Detroit, Mich.

[21] Appl. No.: 632,196

[22] Filed: Apr. 15, 1996

[51] Int. Cl.$^6$ .................................................. B60K 41/28
[52] U.S. Cl. ........................... 477/92; 477/111; 477/116
[58] Field of Search ............................. 477/92, 109, 111, 477/116, 117

[56] References Cited

U.S. PATENT DOCUMENTS 5,107,723  4/1992  Yamashita et al. ..................... 477/117
5,216,938  6/1993  Yamaguchi ............................ 477/116

*Primary Examiner*—Dirk Wright
*Attorney, Agent, or Firm*—Vincent A. Cichosz

[57] ABSTRACT

A motor vehicle having an internal combustion engine and multi-ratio transmission is launched from a neutral idle rest condition. At neutral idle, the transmission is controlled such that the input and output members are decoupled. During vehicle launch, engine output is limit controlled to achieve desired shift quality as the transmission progressively couples the input and output members to transfer torque to the vehicle drive wheels.

7 Claims, 10 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |
| NEUT | | | | | X |

AUTOMATIC NEUTRAL TO DRIVE SHIFT CONTROL

BACKGROUND

The present invention relates to a method of controlling a shift in an automatic transmission, and more particularly, for automatic shifts from neutral to a forward drive range.

Generally, a motor vehicle automatic transmission includes a number of gear elements coupling its input and output shafts, and a related number of torque transmitting devices such as clutches and brakes which are selectively engageable to activate certain gear elements for establishing a desired speed ratio between the input and output shafts in accord with a predetermined shift pattern. The brake can be of the band type or disc type; those skilled in the art refer to disc type brakes in transmissions as clutches or reaction clutches. As used herein, the terms clutches and torque transmitting devices may be used interchangeably and refer to brakes as well as clutches.

The input shaft is connected to the vehicle engine through a fluid coupling, such as a torque converter, and the output shaft is coupled directly to the vehicle wheels. Shifting from one forward speed ratio to another is performed in response to engine throttle and vehicle speed and generally involves releasing or disengaging the clutch (off-going) associated with the current speed ratio and applying or engaging the clutch (on-coming) associated with the desired speed ratio. The speed ratio is defined as the transmission input speed or turbine speed divided by the output speed. Thus, a low gear has a high speed ratio while a higher gear has a lower speed ratio. To perform an upshift, for example, a shift is made from a high speed ratio to a low speed ratio.

Manual garage shifts generally require shifting from neutral to forward, neutral to reverse, forward to reverse or reverse to forward by operator selection of an appropriate forward gear range (e.g. Over Drive, D, 2, 1) or reverse gear (i.e. R) from the gear select lever. These types of shifts may be referred to generally as garage shifts. When shifting from neutral, no off-going clutch is employed but an on-coming clutch is applied. A special type of garage shift not requiring gear lever manipulation by the operator known as an automatic neutral to drive (A/N to D) shift on the other hand is invoked from a neutral idle condition and generally requires operator release of the service brakes while in a forward gear range at or near zero vehicle speed. A/N to D shifts are only effective in a forward gear range and are utilized to establish torque transfer from the vehicle engine to the vehicle wheels from a neutral idle operating mode of the powertrain to launch the vehicle. These types of shifts also may be referred generally as garage shifts and more descriptively as automatic neutral to drive, or A/N to D, shifts.

Neutral idle operation is generally characterized by the vehicle at rest, service brakes applied, gear select lever in a forward range and all combinations of torque transmitting clutches which establish a speed ratio from the input to the output member of the transmission being in respective states ineffective to establish any such speed ratio. Therefore, neutral idle operation is further characterized by the transmission input shaft rotating at substantially synchronous speed with the engine output shaft. Such neutral idle operation is of course beneficial, for example, to reduce engine fueling requirements by unloading the engine at zero vehicle speed idle conditions.

In order that the vehicle be accelerated from a neutral idle stop, a clutch (or clutches) associated with a forward speed ratio must be engaged. A vehicle operator will normally apply throttle soon after releasing the service brakes. Aggressive throttle application, that is various combinations of (a) the time between release of the service brakes and throttle application, (b) magnitude of throttle application, and (c) rate of throttle application, may result in poor shift quality. Poor shift quality may include such effects as large output torque disturbances, undesirably short and harsh shifts, and undesirably long shifts with associated high on-coming clutch heating and premature wear.

SUMMARY

Therefore, the present invention is directed toward a method of powertrain control which recognizes an incipient neutral to drive shift and takes appropriate measures to ensure the quality of such shift. Incipient neutral to drive shifts may, for example, be indicated by operator release of the service brake pedal or a combination of such release followed by an accelerator pedal actuation. The present invention is embodied in a motor vehicle powertrain having an internal combustion engine, multi-ratio automatic transmission and a torque transmitting fluid coupling therebetween such as a conventional torque converter. The internal combustion engine is characterized by limit controls respecting output torque and engine speed, including neutral idle engine speed. During periods of neutral idle, the input and output members of the transmission are decoupled as no combination of torque transmitting devices such as clutches, brakes, bands provides for torque coupling through the transmission and the input member rotates at substantially the engine speed.

According to one aspect of the present invention, at the onset of an automatic neutral to drive shift, an engine torque limit is set to a predetermined engine torque having a nominal value. Thereafter during the continuation of the shift, the engine output torque is constrained by the engine torque limit regardless of any torque request in excess thereof received from the vehicle operator.

According to another aspect of the present invention, at the onset of an automatic neutral to drive shift, an engine speed limit is set to a predetermined engine speed having a value in excess of the neutral idle engine speed. Thereafter during the continuation of the shift, the engine speed is constrained by the engine speed limit. The powertrain is therefore partially responsive to operator input through engine speeds up to the engine speed limit.

According to yet another aspect of the present invention, at the onset of an automatic neutral to drive shift, an engine speed limit is set to a first predetermined engine speed having a value in excess of the neutral idle engine speed. Thereafter during a predetermined portion of the shift, the engine speed is constrained by the engine speed limit. Subsequent to the predetermined portion of the shift, the engine speed is allowed to increase at a controlled rate until the shift is complete or a second engine speed limit is reached the second engine speed limit may be the maximum engine speed allowable in accordance with predetermined engine calibration limits. The powertrain is therefore partially responsive to operator input through a first portion of the shift and thereafter progressively more responsive through completion of the shift or through calibrated engine limits.

In the latter most example, the period of the neutral to drive shift through which engine speed is limited to the first predetermined speed is preferably associated with a portion of the shift most affected or vulnerable to the effects of excessive torque request from the vehicle operator and includes, for example, a conventional fill phase of a clutch cavity.

BRIEF DESCRIPTION OF THE DRAWINGS

The present invention will now be described, by way of example, with reference to the accompanying drawings, in which.

DETAILED DESCRIPTION OF THE INVENTION

Figure 1A:
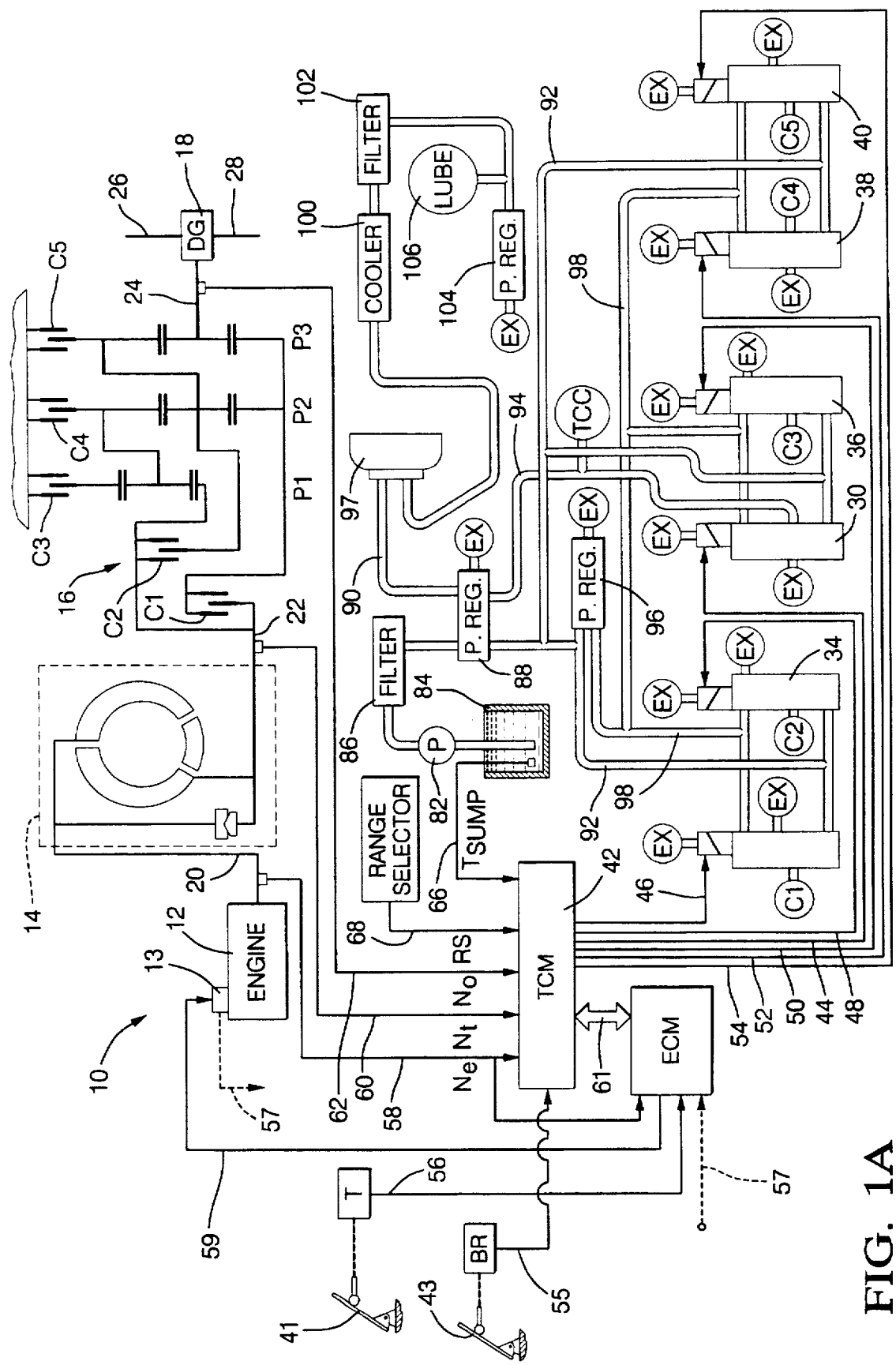
FIG. 1a is a system schematic of a fluid operated transmission including electronically controlled fluid valves, clutches, and computer control units (ECM and TCM) for carrying out the control of the preset invention.

Referring now to the drawings, and more particularly to FIG. 1a, the reference numeral 10 generally designates a motor vehicle drive train including a fuel throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gear set is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement, require a fill time before torque is transmitted between a driving and a driven friction element.

The speed and torque relationships between the engine 12 and the drive wheels of the vehicle are controlled by a fluid operated torque converter clutch, designed TCC, and five fluid operated transmission clutches, designed C1–C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio or neutral. It will be noted that in neutral, the clutch C5 is engaged so that a shift can be made to reverse or the first forward range by applying clutch C3 or clutch C1, respectively. It is also apparent that a shift between forward and reverse requires only a release of one clutch and the application of one clutch. The illustrated transmission gear set provides one reverse ratio and six forward ratios, and is described in detail in the U.S. Pat. No. 4,070,927 to Polak, issued Jan. 31, 1978, and assigned to the assignee of the present invention.

The operation of the solenoid operated control valves 30–40 is controlled by a computer-based transmission control module (TCM) 42 via lines 44–54 in response to various input signals representative of system parameters. Such inputs include an engine output shaft speed signal Ne on line 58, a torque converter output shaft speed signal Nt on line 60, a transmission output shaft speed signal No on line 62, a transmission fluid temperature signal Tsump on line 66, an operator range selector position signal RS on line 68, and a service brake signal on line 55. The input signals are obtained with conventional electrical transducers such as potentiometers, thermistors and magnetic speed pickups or simple binary switch inputs such as may represent service brake application and release.

Internally, TCM 42 comprises a number of conventional devices including a microcomputer with internal clock and memory, an input-output section including A/D and D/A as required, and an array of PWM generators and drivers. The PWM outputs are delivered to respective drivers and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

In addition to solenoid valve control functions, TCM 42 is operative to calculate or reference desired torque control parameters of the powertrain. For example, it is well known that certain types of clutch to clutch ratio changes may benefit from input torque reductions during the shift to reduce clutch loads, reduce output torque disturbances and/or reduce or prevent engine flare. Controls for accomplishing such torque reductions may be found for example in U.S. Pat. Nos. 5,445,576 and 5,129,286, assigned to Saturn Corporation. Such exemplary methods employ table reference of a torque reducing control parameter in a conventional throttle cable controlled spark-ignition internal combustion engine to adjust engine output torque. The particular torque reducing control parameter used in such example being spark retard as a predetermined function of a measure of shift progression. Of course the present exemplary powertrain apparatus may alternatively employ throttle control to attenuate the engine output torque since electronic throttle control is employed.

Operation of the internal combustion engine 12 is controlled by a conventional computer-based engine control module (ECM) 64 in response to various input signals representative of system parameters, operator torque requests and TCM communicated data. Such inputs include an accelerator position signal on line 56, and an engine output shaft speed signal Ne on line 58. In addition to input signals on discrete lines, bi-directional data link 61 interfacing TCM 42 with ECM 64 provides ECM 64 with various engine torque and speed control data including control mode commands, device priority, and mode control data. The operator manipulated accelerator pedal 41 position is conveyed through the accelerator position sensor 'T' for providing an operator torque request signal. The output of fuel throttled engine 12 is controlled in accord with the fuel metering signal on line 59 to fuel metering system 13. Fuel metering system 13 may be any of a variety of well known electronically or electro-mechanically controlled fuel metering systems, examples of which include electronically-governed in-line fuel-injection pump systems, electronically-governed distributor-type fuel-injection pump, or electronically controlled fuel-injector systems. A further input to ECM 64 may include a fuel metering system feedback signal on line 57 such as a rack-position sensor conventionally used in conjunction with an electronically-governed in-line fuel-injection pump system.

Alternatively, air-throttled internal combustion engines may be similarly employed with the control of the present invention. Using the same number designations, an air-throttled engine would include conventional air throttling system 13 including throttle plate and position sensor therefor. The position sensor, not separately shown, would provide a throttle position signal on line 57 in a conventional manner. Throttle opening would be controlled by throttle signal on line 59 controlling a conventional throttle plate actuator. Additionally, a spark-ignition internal combustion engine includes a spark-ignition system (not shown) including a conventional electronic spark timing unit to initiate combustion in accordance with a spark timing signal from ECM 64 and fuel injection apparatus (not shown) controlled in a well known manner by fueling pulse width signals also generated by the ECM 64.

Although illustrated with respect to implementation in a vehicle having a fuel throttled engine, the present invention is, as mentioned, applicable to any other variety of internal combustion engine including a conventional air-throttled spark-ignition engine. As referred to herein, throttling is understood to mean fuel throttling or air throttling. Throttle closed is understood to mean minimal fueling or air ingestion while full throttle or wide open throttle shall be understood to mean maximum fueling or air ingestion.

ECM 64 and TCM 42 in the present embodiment preferably communicate via a serial data link using SAE J1939 data communication protocol. As such, and in accordance with the present invention, TCM operates to communicate to the ECM for each A/N to D shift a torque limit value, an engine speed limit value, an override control mode and associated priority. For purposes of the present invention, the priority, or relative measure of priority with respect to other networked controllers such as a traction control module, is assumed to be the highest priority available such that lower priority devices requesting an override control mode will be ignored. Such protocol is generally well known to those having ordinary skill in the art.

The hydraulic circuit of transmission 16 includes a positive displacement pump 82 for supplying pressurized hydraulic fluid from the sump or reservoir 84, to the clutches TCC and C1–C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30–40, and also to the control pressure regulator valve 96. The control pressure regulator valve 96 develops a somewhat lower pressure in line 98, referred to herein as the control pressure, such pressure being directed to the solenoid of each control valve 30–40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lockup mode.

Figures 1B, 2:
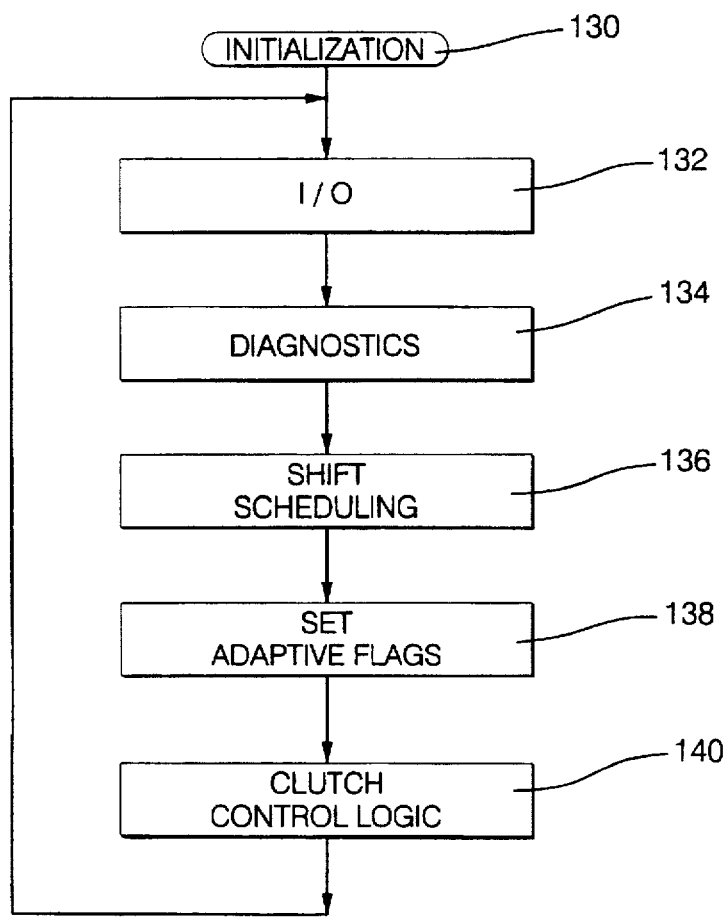
FIG. 1b is a chart illustrating the various clutch applications for establishing the various speed ratios and neutral in the transmission.
FIGS. 2 and 3a–3b are flow diagrams representative of computer program instructions for executed by the TCM shown in figure 1a in carrying out the shift control of the transmission.

FIGS. 2, 3a–3b, 7, 8 9 and 10 are flow diagrams representative of computer program instructions executed by the computer-based TCM 42 of FIG. 1 in carrying out the A/N to D shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various times, registers and variable values of control unit 42 to predetermined initial values. Thereafter, the blocks 132–140 are sequentially and repeatedly executed as indicated by the flow diagram lines. Block 132 reads the various input signal values and outputs the required control signals to the PWM generators and drivers for solenoid controlled valves 30–40. Blocks 134–138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a–3b.

Figure 3A:
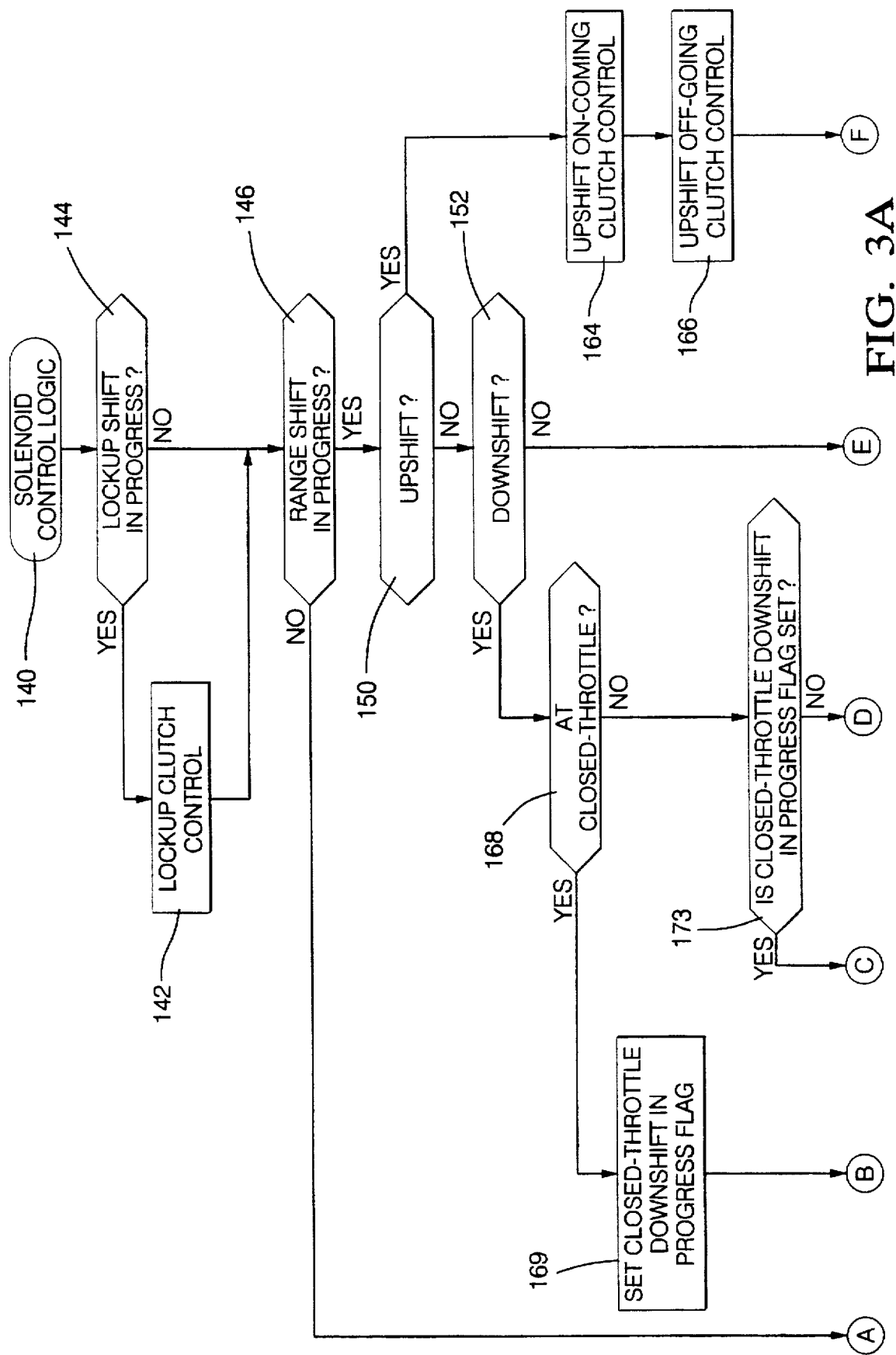
Figure 3B:
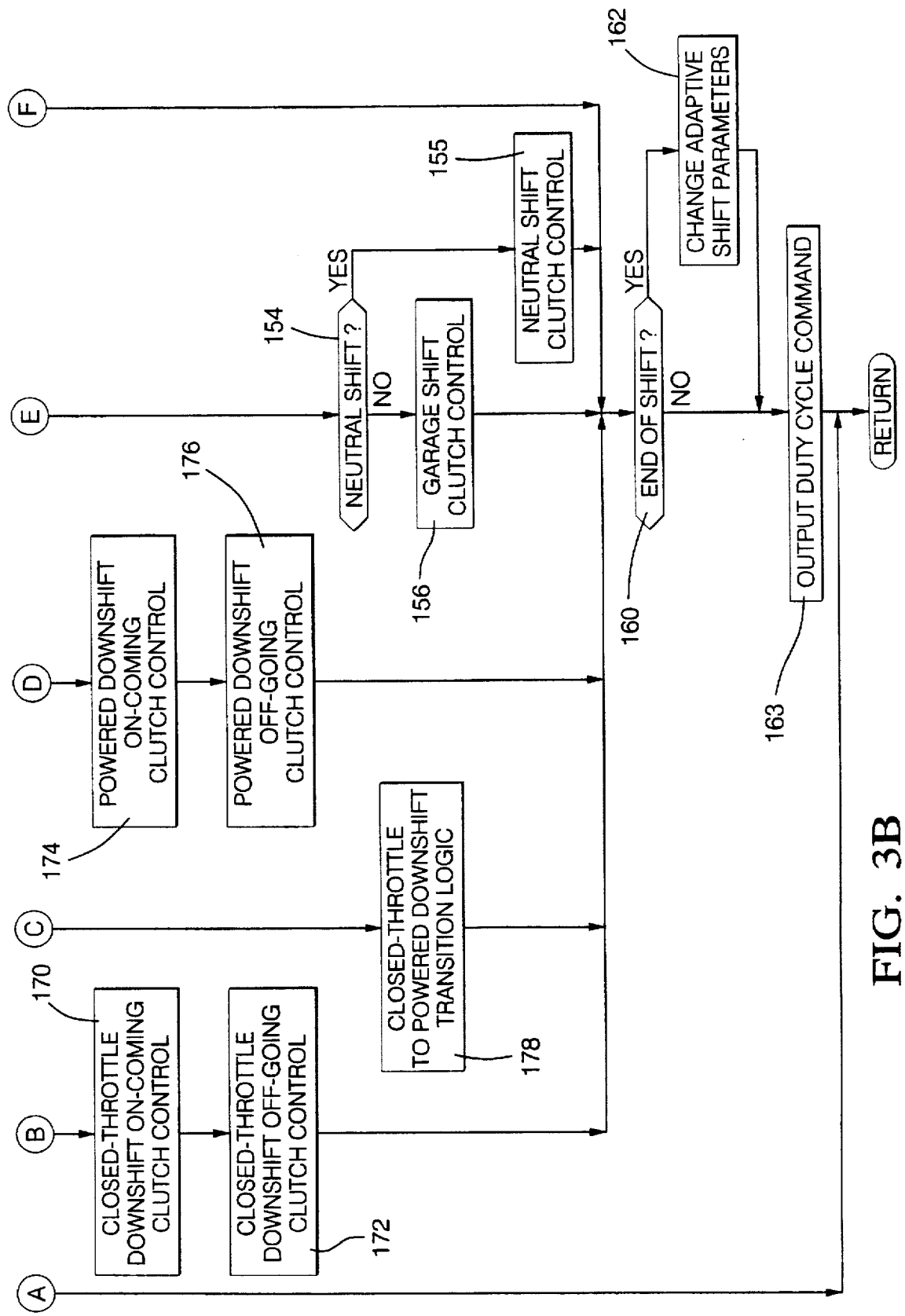
Figure 4A:
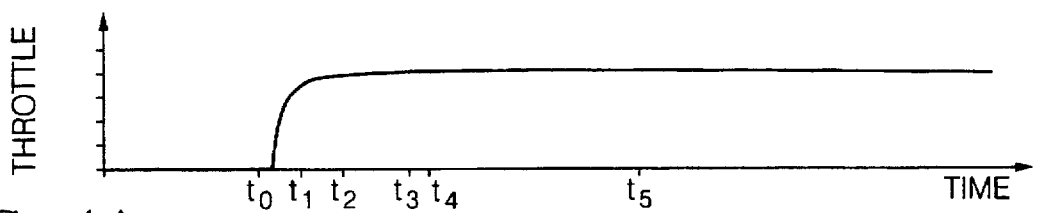
FIGS. 4A–4E are charts showing various powertrain control and response quantities related to a neutral to drive shift practiced without the control of the present invention and with one embodiment of the present invention.
Figure 4B:
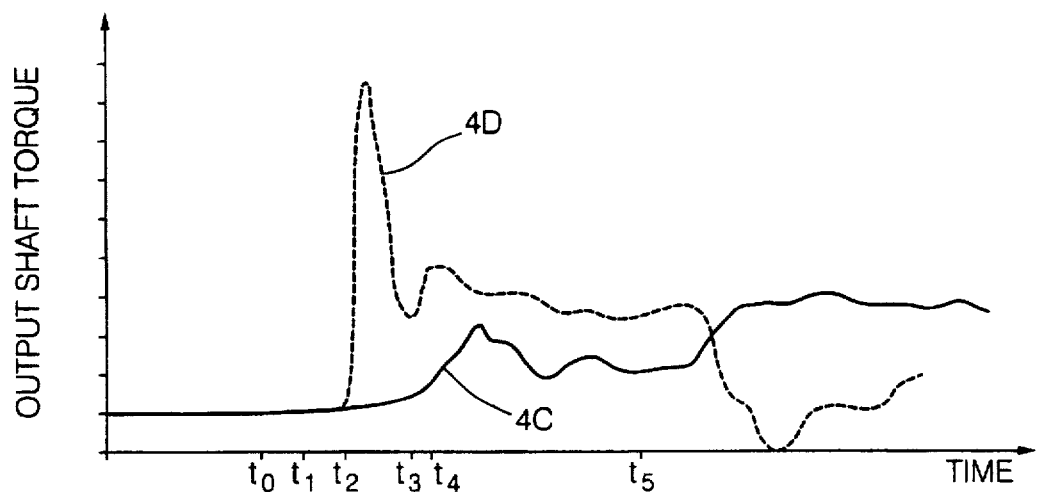
Figure 4C:
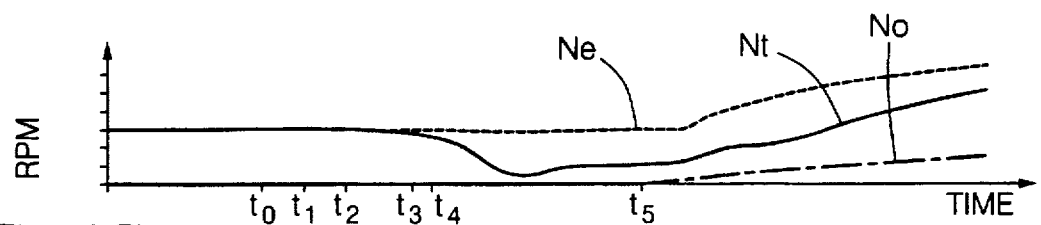
Figure 4D:
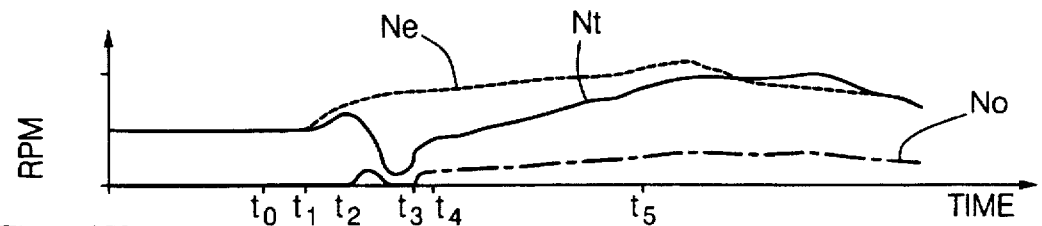
Figure 4E:
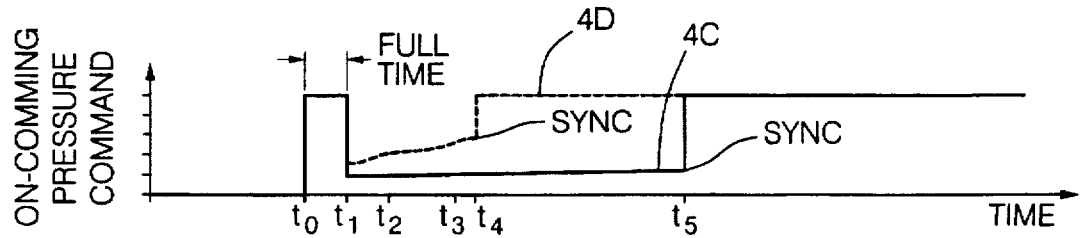
Figure 5A:
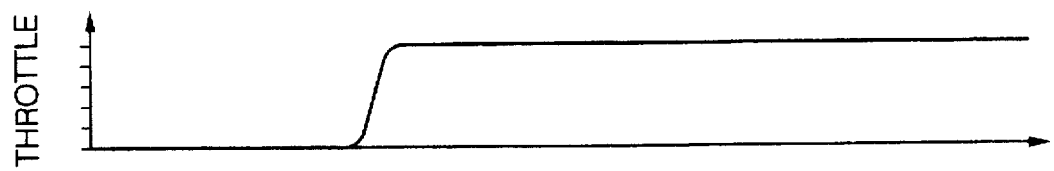
FIGS. 5A–5D are charts showing various powertrain control and response quantities related to a neutral to drive shift practiced with another embodiment of the present invention.
Figure 5B:
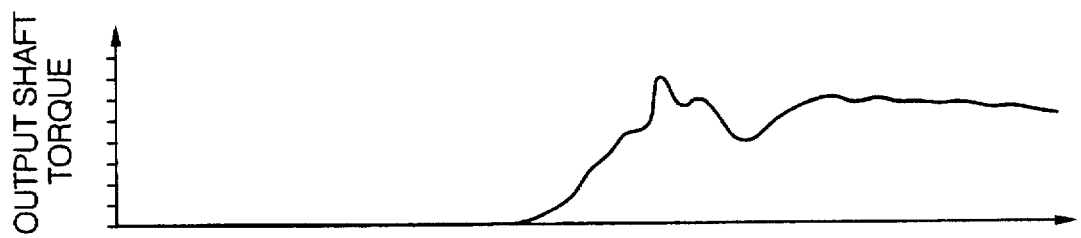
Figure 5C:
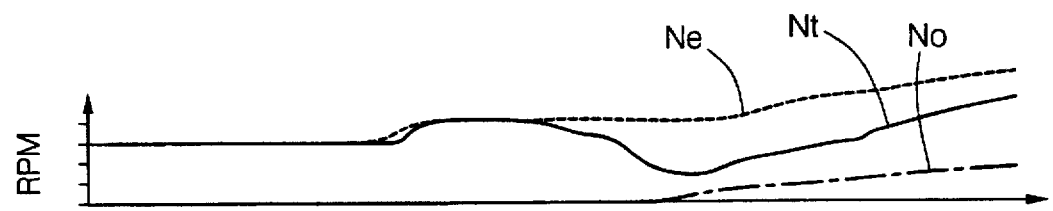
Figure 5D:
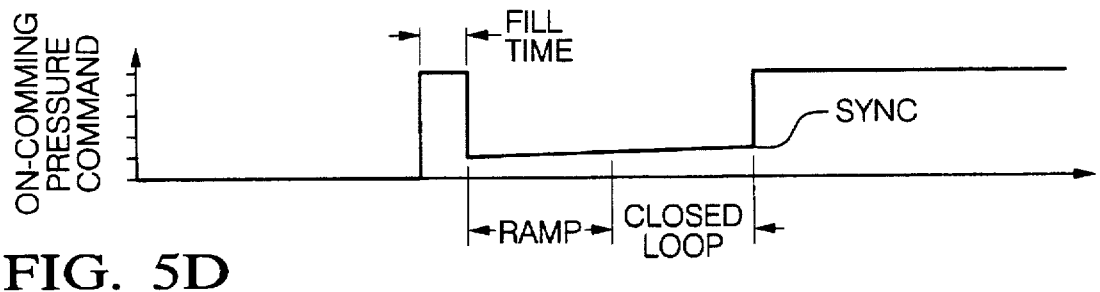
Figure 6A:
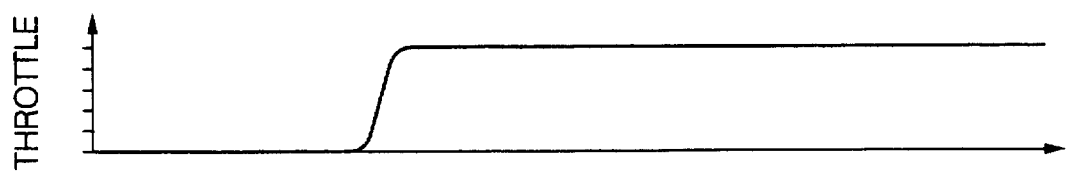
FIGS. 6A–6D are charts showing various powertrain control and response quantities related to a neutral to drive shift practiced with yet another embodiment of the present invention.
Figure 6B:
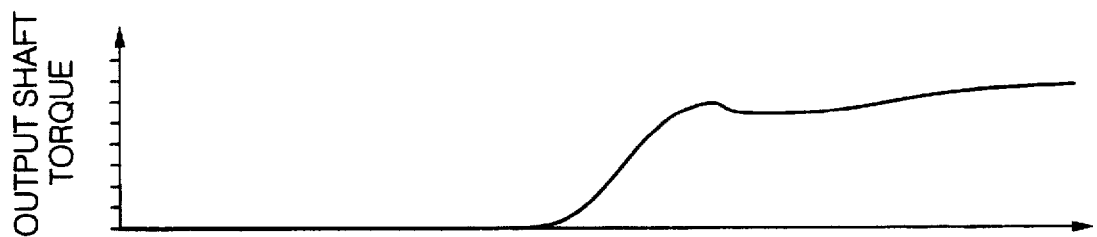
Figure 6C:
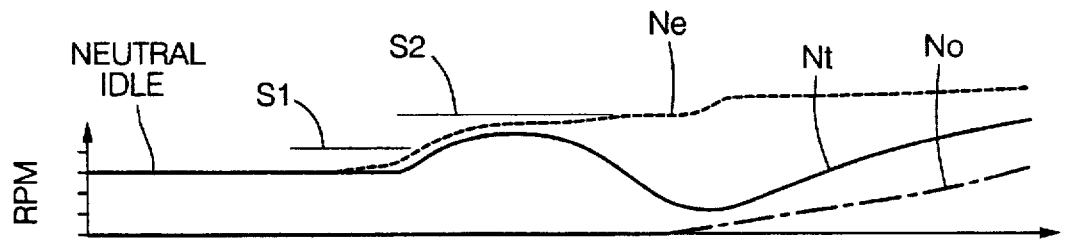
Figure 6D:
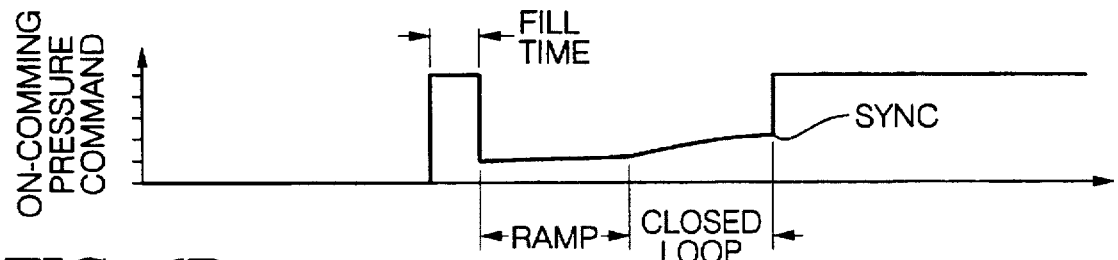

The flow diagram of FIGS. 3a–3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift, as mentioned, is a shift from neutral to either drive or reverse, or a shift from drive to reverse or from reverse to drive and includes automatic neutral to drive shifts. The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary; in such case, the appropriate transition logic is invoked <178>. If the shift is a neutral shift <154>, the neutral shift clutch control executes shifts from drive to neutral or from reverse to neutral <155>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1-2, 2-1, 4-3, 5-4, etc. Converter and lockup modes may also require separate sets of calibration values.

The types of shifts of interest are the automatic neutral to drive shifts in the garage shift category. Reference is now made to the FIGS. 4A–4E illustrating certain features of an unacceptable A/N to D shift and certain corrective control measures practiced by the control of the present invention. Prior to a A/N to D shift, the vehicle transmission is operating such that the input is decoupled from the output. That is to say minimal or no torque transfer is occurring therebetween. The transmission is said to be operating in a neutral idle condition. All clutches excepting clutch C5, including most pertinently clutch C1 associated with the first speed ratio, have inconsequential torque capacity as can be seen by examination of the range/clutch chart of FIG. 1b. As described, the neutral idle condition is associated with application of the service brakes with the vehicle substantially at standstill (i.e. minimal or zero output speed No). Initiation of a A/N to D shift is predicated upon the gear select lever still being in a forward speed range and at least the release of the service brake by the vehicle operator. Additionally, a further indicator of the desirability of initiating a A/N to D shift may include a predetermined positive change in accelerator pedal position. For purpose of exposition in the present embodiment, release of the service brake is assumed to sufficiently indicate the desirability of accelerating the vehicle and hence the necessity of a A/N to D shift.

Referring to chart A of FIG. 4, at some time after release of the service brake as may be typical, the operator may step-into the accelerator pedal. Aggressive step-in conditions, including immediacy, magnitude and rate of step-in, may result in poor shift quality. Such an accelerator step-in is illustrated in chart A of FIG. 4, and one effect of such step-in may be viewed in the illustration of transmission output shaft torque in chart B of FIG. 4. The broken trace in chart B shows a characteristic output shaft torque disturbance or transient response to the excessive torque developed by the engine in response to the aggressive throttle step-in. The solid trace on the other hand shows an output shaft torque response produced when the same aggressive accelerator step-in occurs with the control of the present invention.

Chart E of FIG. 4 is representative of the commanded clutch pressure of clutch C1 in an A/N to D shift. Generally, the pressure command has a fill time followed by a ramp duration followed by a closed loop duration terminating when synchronism is established between the transmission input and output as measured by the turbine speed Nt, the output speed No, and the target speed ratio. Synchronism is generally determined when the turbine speed reaches a target speed as measured as the product of the output speed and the target speed ratio. The fill time prepares the clutch for torque transfer by filling the clutch cavity after which the pressure command drops to a predetermined pressure from which it increases in ramp fashion to begin pull down of the turbine speed. After the turbine speed reaches a predetermined value, the closed loop control controls the turbine speed to smoothly and quickly reach synchronism by engaging the oncoming clutch. Other methods of clutch pressure control my be applied within the scope of the present invention including pure open loop control, the fill/ramp/closed loop control of the present embodiment being offered by way of a preferred known method of clutch control.

The broken trace of chart E FIG. 4 corresponds to a shift accomplished without the benefit of the present control while the solid trace corresponds to a shift performed with the present control. In both charts B and E of FIG. 4, the broken traces are labeled with circled '4D' to establish their correspondence to chart D of FIG. 4 which illustrates various speed quantities of the powertrain during an exemplary A/N to D shift in the absence of the control of the present invention. Particularly, engine speed Ne, turbine speed Nt and transmission output speed No are plotted. Similarly, the solid traces of both charts B and E of FIG. 4, are labeled with circled '4C' to establish their correspondence to chart C of FIG. 4 which is illustrative of the same speed quantities of the powertrain during an exemplary A/N to D shift under the same aggressive accelerator conditions, however, employing the control of the present invention to address the undesirable effects.

First, with reference to the pertinent traces of the various charts of FIG. 4, the aggressive accelerator step-in manifests itself in an undesirably short, harsh shift. Since the transmission is in neutral idle, the turbine speed is seen to be at or near engine idle speed. Turbine speed is then seen to follow the engine speed as it is accelerated from the neutral idle speed, clutch C1 not yet having sufficient torque capacity to prevent its acceleration let alone pull its speed down. During this period, the clutch pressure command is seen to ramp at a relatively high rate thereby building capacity sufficient to pull down the turbine speed just prior to $t_2$. At time $t_2$, the turbine speed is seen decelerating from a peak value and has reached a set value, such as 25 RPM less than the peak since shift initiation thus indicating turbine speed pull down. This triggers the closed loop portion of control ($t_2$–$t_4$) wherein the turbine speed is controlled to synchronize with the output speed at time $t_4$. As can be appreciated, the shift is relatively short and harsh, with substantial output torque disturbance and output speed disturbance.

Similarly, according to a first embodiment of the present invention, turbine speed is seen to be at or near engine idle speed. Engine speed is seen to remain substantially constant at the neutral idle speed throughout the shift. Turbine speed, however, is seen to be smoothly pulled down. In this example, the accelerator step-in is not permitted to produce changes in the engine output torque throughout the shift. Therefore, regardless of the operator command vis-a-vis the accelerator pedal input, the shift is allowed to progress by managing the engine output torque in accordance with the control of the invention such that engine output torque is limited to magnitudes readily overcome by the on-coming clutch to prevent significant output torque disturbances. Of course, engine speed will be maintained at the neutral idle speed through use of conventional idle governor control or idle speed control to maintain the engine output sufficient to prevent stalling. The control essentially allows for progression of the shift as if no torque increase request were received and translates into a more gradual ramp phase after clutch cavity fill ($t_1$-$t_3$) and more gradual closed loop phase ($t_3$-$t_5$). After synchronism is reached at time $t_5$, the control is once again responsive to the accelerator pedal input to accelerate the engine and hence effectuate the vehicle launch in accordance with the operator demand.

An alternative embodiment of the present invention is manifest in the various charts of FIG. 5 wherein engine speed is seen permitted to increase in response to accelerator step-in. However, the torque request vis-a-vis the step-in is not allowed full authority over the engine speed. Rather, the control provides for limited engine torque increases and concomitant engine speed increases up to a set engine speed. Further torque increases beyond that achieving the set engine speed will not be permitted. Such partial response to the step-in provides the operator with a satisfactory level of throttle feel through a met expectation of engine noise and increased engine torque during the pull down of the turbine as the engine attempts to maintain the set speed during the on-coming clutch engagement. After synchronism is reached and normal control is returned, a smaller torque step is required to reach the torque level corresponding to the relatively high operator demand.

FIG. 6 provides an illustration of yet another embodiment of the present invention wherein engine speed is also seen permitted to increase in response to accelerator step-in again only with partial authority over the engine speed. The control provides for engine torque increases up to a set engine speed (S1) through a first portion of the A/N to D shift. In the present illustration, the first portion of the shift is defined by the fill phase. Therefore, engine speed is limited during this portion of the shift to a set engine speed S1. After the first portion of the shift is complete, the engine speed limit is allowed to ramp throughout the remainder of the shift progression to a second set speed (S2) such that engine speed may further increase as torque is progressively transferred across the oncoming clutch and applied to the vehicle wheels to accelerate the vehicle. Such response to the step-in provides the operator with an immediate satisfactory level of throttle feel through a met expectation of engine noise and increased engine torque during the on-coming clutch torque capacity increase. The engine speed limit is progressively increased allowing for torque increases and a more aggressive acceleration response. After synchronism is reached, normal control is returned.

Figure 7:
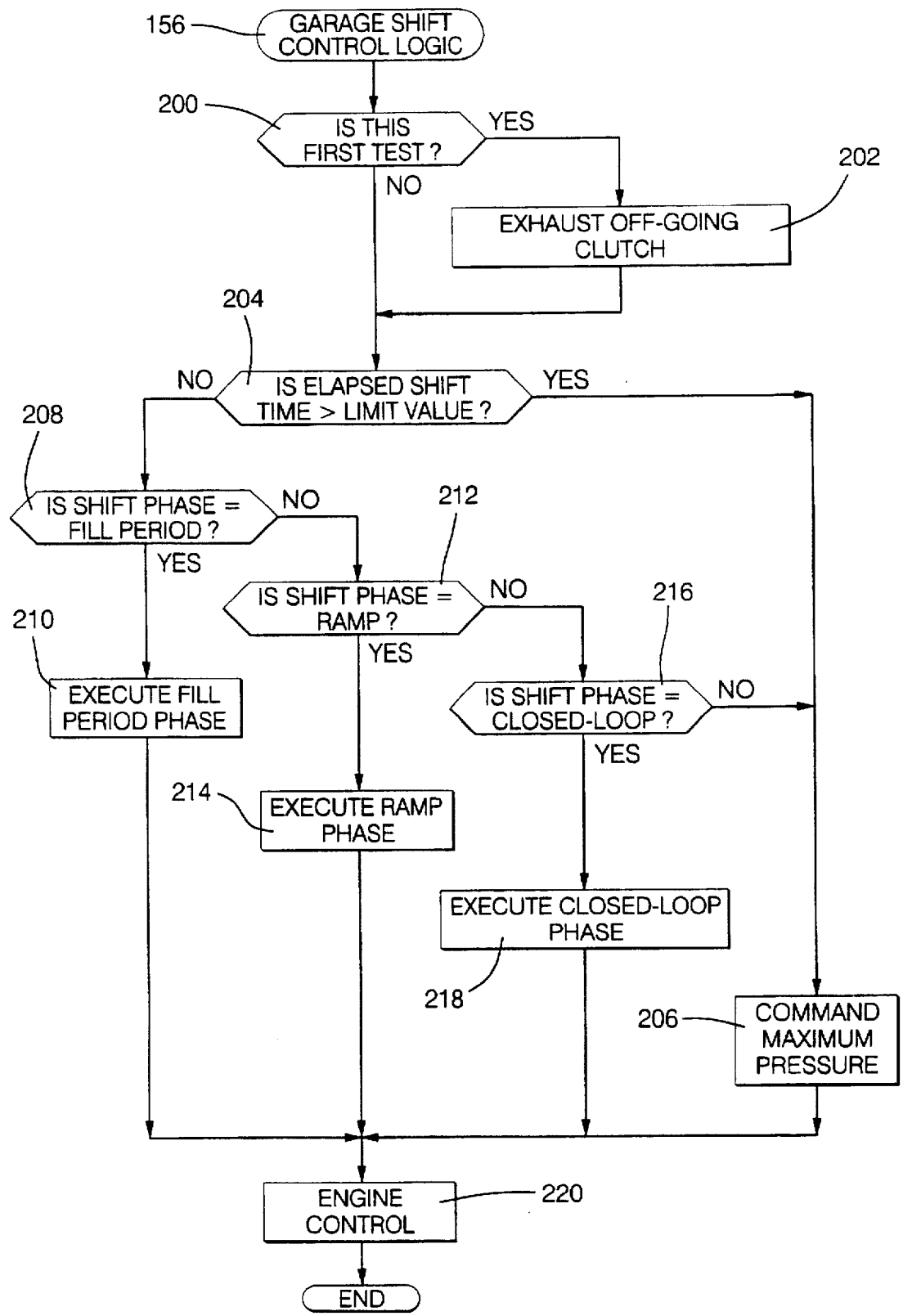
FIG. 7 is a flow diagram representing generally the steps executed by the TCM of FIG. 1a in establishing the various shift phases of a garage shift inclusive of an automatic neutral to drive shift.

Referring now to FIG. 7, a flow diagram representing a set of program instructions <200> through <218> tracking through the various phases of an automatic neutral to drive shift including a general engine control block is illustrated. The engine control block <220> is representative of a separate group of instructions executed to develop appropriate engine control instructions and data in accordance with the various embodiments of the present invention. Upon the first pass through the loop as tested at block <200>, the off-going clutch (none if a A/N to D shift) is exhausted. Thereafter, block <204> determines if a maximum amount of time has elapsed during the shift after which full engagement of the on-coming clutch <206> would be proper to force synchronism and close the shift. The remainder of the logic determines the appropriate phase of the present shift as previously generally described. Such phases include fill <210>, ramp <214>, and closed-loop <218>.

Figure 9:
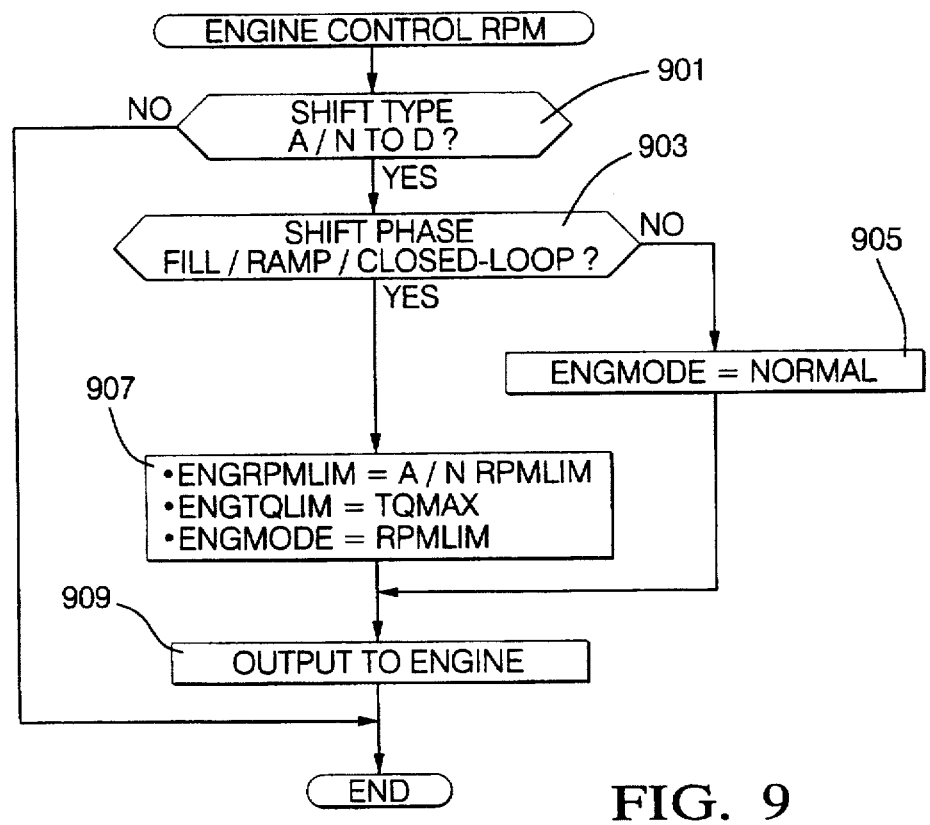
Figure 10:
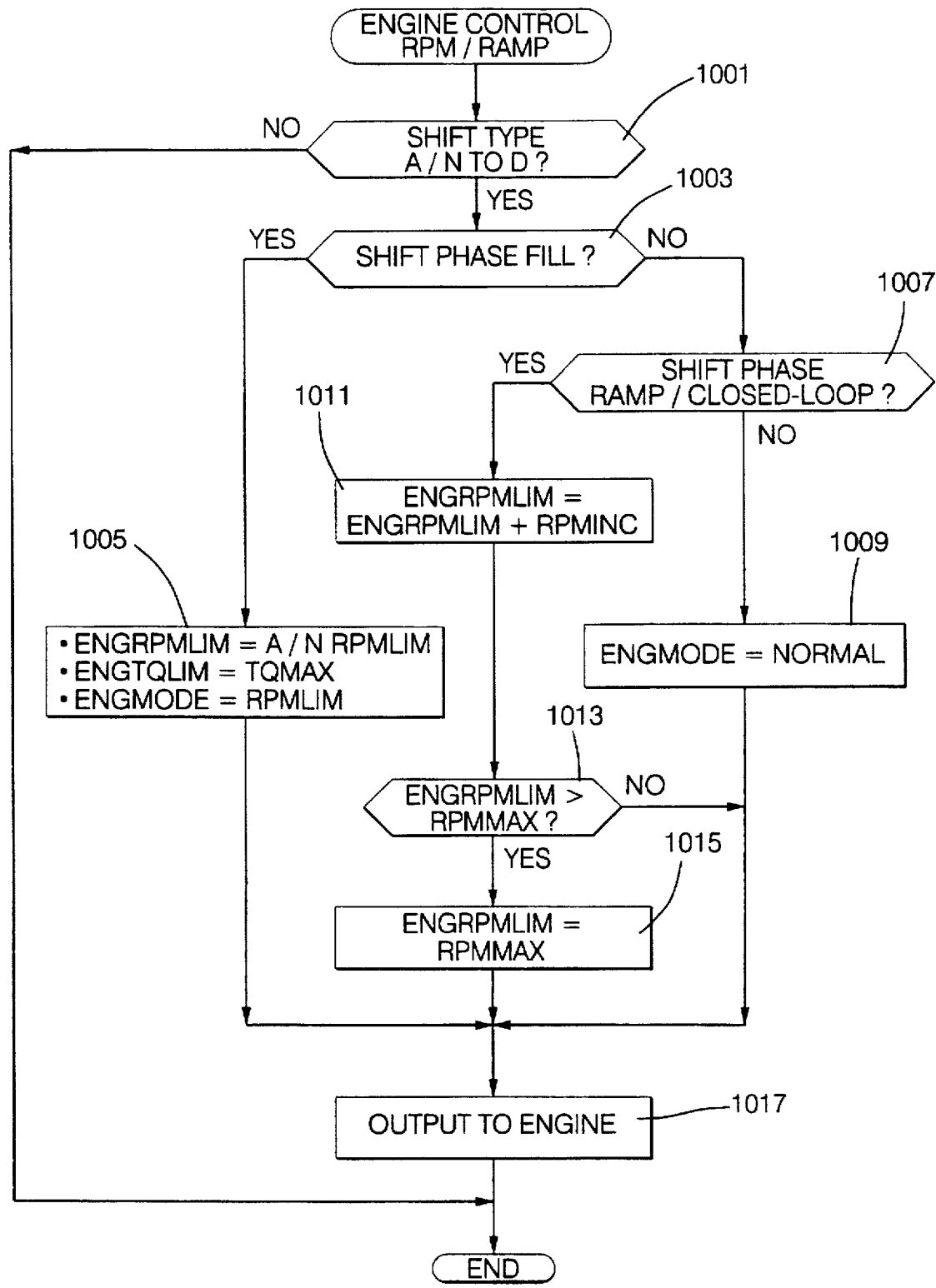

Engine control block <220> is then executed to develop the appropriate engine torque and speed control data including control mode command, device priority (highest), and mode control data (i.e. torque and speed limit values) in accordance with one of the previously described A/N to D shift controls including torque limit control (FIG. 8), speed limit control (FIG. 9), or speed limit/ramp control (FIG. 10).

Figure 8:
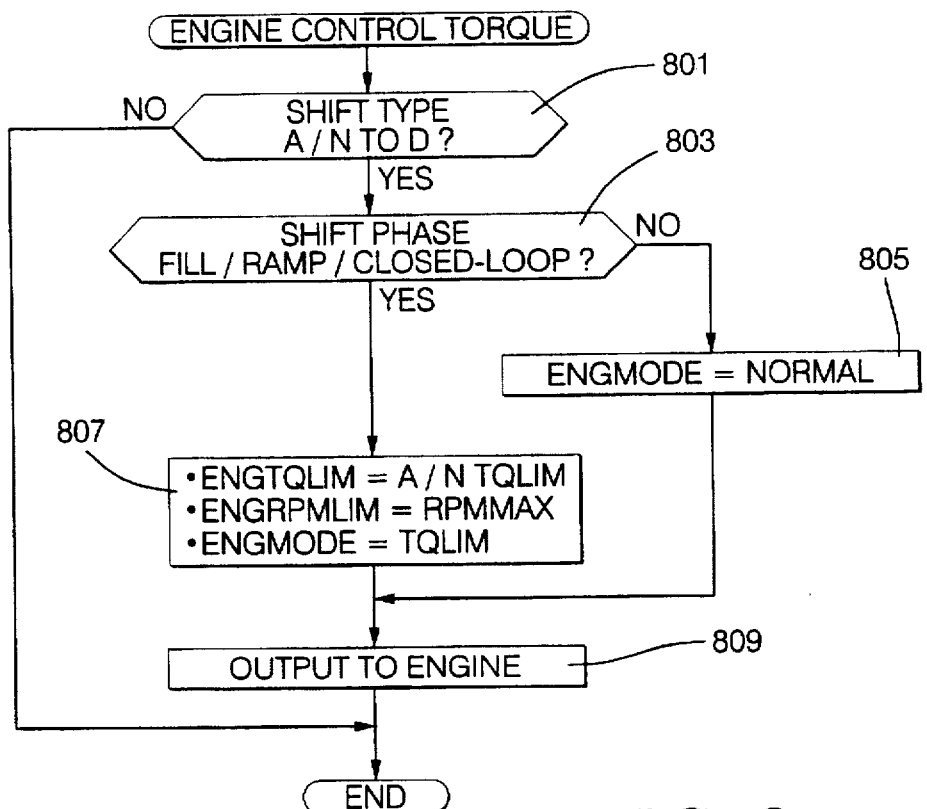
FIGS. 8–10 are flow diagrams representing respective alternative steps executed by the TCM of FIG. 1a in controlling engine output torque during an automatic neutral to drive shift in accordance with the present invention.

Taking the various A/N to D shift control alternatives in order of presentation, FIG. 8 represents a torque limit routine executed at the point of the routine labeled <220> in FIG. 7. Upon entry, a determination is made as to whether the present shift is a A/N to D shift <801>. If not, the remainder of the steps are bypassed and the ECM controls the engine functions in accordance with normal control functions or alternative override control functions from other networked controllers as appropriate. A A/N to D shift being the case, the shift progression is checked <803> to determines whether the shift is within an appropriate progression window defined in the present embodiment as the fill phase, ramp phase or closed loop phase. If not, the override control mode ENGMODE is set to NORMAL <805> essentially providing the ECM with no override of engine control functions. This will be the case where a A/N to D shift has not yet entered the fill phase or has completed the closed loop phase of the present shift to return normal engine control. If, however, the A/N to D shift is within the appropriate progression window, the torque limit value ENGTQLIM is set to a predefined value A/NTQLIM, the engine speed limit value ENGRPMLIM is set to the normal maximum engine speed calibration RPMMAX, and the override control mode ENGMODE is set to a torque limit mode TQLIM. ENGTQLIM is expressed as a percentage of a calibrated value of available maximum engine torque and is preferably set to a value of zero or some nominal non-zero value thus effectively providing an override of the operator torque demand such that engine output torque is limited to magnitudes readily overcome by the on-coming clutch. Block <809> when encountered from block <805> or <807> represents the transfer and execution of the torque and speed control data to and by the ECM. Preferably, the controlled engine parameter in the case of the fuel throttled engine is fuel. In the case of an air throttle engine, the preferred controlled engine parameter is air ingestion which in turn will effect the amount of fuel provided to the engine in accordance with well known conventional engine controls. Alternatively, spark retard may be employed in conjunction with normal throttle response to effectuate the desired torque limit.

FIG. 9 represents an engine speed limit routine alternatively executed at the point of the routine labeled <220> in FIG. 7. Upon entry, a determination is made as to whether the present shift is a A/N to D shift <901>. If not, the remainder of the steps are bypassed and the ECM controls the engine functions in accordance with normal control functions or alternative override control functions from other networked controllers as appropriate. A A/N to D shift being the case, the shift progression is checked <903> to determines whether the shift is within an appropriate progression window defined in the present embodiment as the fill phase, ramp phase or closed loop phase. If not, the override control mode ENGMODE is set to NORMAL <905> essentially providing the ECM with no override of engine control functions. This will be the case where a A/N to D shift has not yet entered the fill phase or has completed the closed loop phase of the present shift. If, however, the A/N to D shift is within the appropriate progression window, the torque limit value ENGTQLIM is set to the normal maximum engine torque calibration TQMAX, the engine speed limit value ENGRPMLIM is set to a predefined value A/NRPMLIM, and the override control mode ENGMODE is set to a speed limit mode RPMLIM <907>. A/NRPMLIM is expressed as a scalar quantity set to a predetermined value in excess of the neutral idle speed thereby providing partial response to the operator torque demand as measured by the accelerator position. Block <909> when encountered from block <905> or <907> represents the transfer of the torque and speed control data to the ECM for implementation thereby.

FIG. 10 represents an engine speed limit routine alternatively executed at the point of the routine labeled <220> in FIG. 7. Upon entry, a determination is once again made as to whether the present shift is a A/N to D shift <1001>. If not, the remainder of the steps are bypassed as before and the ECM controls the engine functions in accordance with normal control functions or alternative override control functions from other networked controllers as appropriate. A A/N to D shift being the case, the shift progression is checked <1003> & <1007> to determines whether the shift is within a progression window defined in the present embodiment as the fill phase, ramp phase or closed loop phase. If not, the override control mode ENGMODE is set to NORMAL <1009> essentially providing the ECM with no override of engine control functions. This will be the case where a A/N to D shift has not yet entered the fill phase or has completed the closed loop phase of the present shift. On the other hand, if the shift is within the appropriate progression window, and further specifically within the fill phase, the engine speed limit value ENGRPMLIM is set to a predetermined value A/NRPMLIM corresponding to a speed limit in excess of the neutral idle engine speed, the torque limit value ENGTQLIM is set to the normal maximum engine torque calibration TQMAX, and the override control mode ENGMODE is set to a speed limit mode RPMLIM <1001>. Again, A/NRPMLIM is expressed as a scalar quantity set to a predetermined value in excess of the neutral idle speed thereby providing partial response to the operator torque request as measured by the accelerator pedal position. With reference back to blocks 1003 and 1007, if the shift is within the appropriate progression window, and further specifically after the fill phase completion, the engine speed limit value ENGRPMLIM is progressively ramped by incrementing the previous value therefor by a predetermined amount RPMINC <1011>. The torque limit and override control mode remain unchanged. Thereafter, block <1013> performs a check upon the newly incremented speed limit value and if beyond the maximum calibration value RPMMAX for the engine, sets the speed limit value to the maximum engine speed calibration RPMMAX <1015>. When not in excess of RPMMAX, block <1015> is bypassed such that the engine speed limit continues to increase. Block <1017> when encountered from block <1009>, <1005>, <1013> or <1015> represents the transfer of the torque and speed control data to the ECM and execution for implementation thereby.

While the present invention has been described with respect to certain preferred embodiments, such description is to be taken as exemplary and not limiting, it being recognized that various alternatives and modifications within the scope of the following claims will be apparent to those having ordinary skill in the art.

I claim:

1. The method of powertrain control during an automatic neutral to drive shift in a motor vehicle having an internal combustion engine for producing output torque at an output member in accordance with an operator torque request, an automatic multi-ratio transmission having an output member and an input member coupled to the engine output member through a torque transmitting fluid coupling, the engine being limit controlled in accordance with an upper torque, an upper engine speed, and a neutral idle engine speed, the transmission including a fluid controlled torque transmitting device for establishing a forward speed ratio across the input and output members of the transmission when engaged, the method comprising the steps:

monitoring a set of predetermined powertrain operating parameters during a period of neutral idle operation wherein said torque transmitting device is disengaged and engine torque is substantially decoupled from the transmission output;

when said set of predetermined powertrain operating parameters indicates incipient neutral to drive shift, limiting the engine torque to a predetermined nominal value; and, limiting the upper engine torque to said nominal value for the duration of the neutral to drive shift.

2. The method of powertrain control as claimed in claim 1 wherein said nominal value is substantially zero.

3. The method of powertrain control during an automatic neutral to drive shift in a motor vehicle having an internal combustion engine for producing output torque at an output member in accordance with an operator torque request, an automatic multi-ratio transmission having an output member and an input member coupled to the engine output member through a torque transmitting fluid coupling, the engine being limit controlled in accordance with an upper torque, an upper engine speed limit, and a neutral idle engine speed, the transmission including a fluid controlled torque transmitting device for establishing a forward speed ratio across the input and output members of the transmission when engaged, the method comprising the steps:

monitoring a set of predetermined powertrain operating parameters during a period of neutral idle operation wherein said torque transmitting device is disengaged and engine torque is substantially decoupled from the transmission output;

when said set of predetermined powertrain operating parameters indicates incipient neutral to drive shift, limiting the engine speed to a predetermined value in excess of the neutral idle engine speed; and, limiting the upper engine speed to said predetermined value for the duration of the neutral to drive shift.

4. The method of powertrain control during an automatic neutral to drive shift in a motor vehicle having an internal combustion engine for producing output torque at an output member in accordance with an operator torque request, an automatic multi-ratio transmission having an output member and an input member coupled to the engine output member through a torque transmitting fluid coupling, the engine being limit controlled in accordance with an upper torque, an upper engine speed, and a neutral idle engine speed, the transmission including a fluid controlled torque transmitting device for establishing a forward speed ratio across the input and output members of the transmission when engaged, the method comprising the steps:

monitoring a set of predetermined powertrain operating parameters during a period of neutral idle operation wherein said torque transmitting device is disengaged and engine torque is substantially decoupled from the transmission output;

when said set of predetermined powertrain operating parameters indicates incipient neutral to drive shift, limiting the engine speed to a predetermined nominal value in excess of the neutral idle engine speed; and, limiting the upper engine speed to said nominal value for a predetermined period of the neutral to drive shift after which said nominal value is increased at a predetermined rate until one of (a) the termination of the neutral to drive shift and (b) a predetermined maximum engine speed value is attained.

5. The method of powertrain control as claimed in claim 4 wherein said predetermined powertrain operating parameters includes a service brake application.

6. The method of powertrain control as claimed in claim 4 wherein said predetermined powertrain operating parameters includes a service brake application and an accelerator pedal position.

7. The method of powertrain control as claimed in claim 4 wherein said fluid controlled torque transmitting device includes a clutch cavity for receiving fluid and wherein the automatic neutral to drive shift includes a fill phase characterized by filling the clutch cavity to establish torque capacity across the torque transmitting device, a ramp phase characterized by increasing fluid pressure in the clutch cavity to pull down the transmission input member, and a closed-loop phase to synchronize the transmission input and output members, said predetermined period of the neutral to drive shift comprising the fill phase.

* * * * *